United States Patent
Gerber et al.

(10) Patent No.: US 6,873,846 B1
(45) Date of Patent: Mar. 29, 2005

(54) EXTENDING A LOCATION BASED TELEPHONE CALL FROM A WIRELESS TELEPHONE SET USING A GENERIC ROUTING LIST

(75) Inventors: Eugene Gerber, Bolingbrook, IL (US); Michael Joseph Meyer, Kendall, IL (US); Ted Moulos, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 789 days.

(21) Appl. No.: 09/283,167

(22) Filed: Apr. 1, 1999

(51) Int. Cl.[7] ................................................ H04Q 7/20
(52) U.S. Cl. .................. 455/440; 455/404.2; 455/456.1
(58) Field of Search ............................... 455/440, 456, 455/457, 445, 456.1, 456.2, 456.3, 456.5, 456.6, 463, 439, 404.2

(56) References Cited

U.S. PATENT DOCUMENTS

| | | | | |
|---|---|---|---|---|
| 5,802,492 A | * | 9/1998 | DeLorme et al. | ........... 701/200 |
| 5,845,203 A | * | 12/1998 | LaDue | ...................... 455/414 |
| 6,064,887 A | * | 5/2000 | Kallieoniemi et al. | ...... 455/445 |
| 6,070,080 A | * | 5/2000 | Madour et al. | ............. 455/458 |
| 6,104,929 A | * | 8/2000 | Josse et al. | .................. 455/445 |
| 6,115,461 A | * | 9/2000 | Baiyor et al. | ............... 379/211 |
| 6,134,316 A | * | 10/2000 | Kallioniemi et al. | ....... 379/220 |

* cited by examiner

Primary Examiner—Edward F. Urban
Assistant Examiner—Thuan T. Nguyen

(57) ABSTRACT

A system for providing location data for determining which service provide is to receive a location based telephone call from a wireless telephone set. A list of call routing parameters for a wireless telephone is generated from the location of a wireless telephone. Each call routing parameter is a location descriptor which indicates location of a caller. A switching system then read each calling parameter from the list and attempts to find a service provider to receive the call. The switching system repeats the process until a service provider is determined. The call is then extended to the service provider.

21 Claims, 5 Drawing Sheets

FIG. 5
500

- FROM STEP 307 OF FIG. 3
- 501 — READ CALL SET-UP MESSAGE
- 502 — STORE LOCATION DATA FROM CALL SET-UP MESSAGE
- TO STEP 307 OF FIG. 3

FIG. 6
600

- FROM STEP 307 OF FIG. 3
- 601 — SWITCHING SYSTEM TRANSMITS A REQUEST FOR LOCATION DATA
- 602 — LOCATION SYSTEM RETRIEVES GENERATED LOCATION DATA
- 603 — LOCATION SYSTEM TRANSMITS LOCATION DATA TO SWITCHING SYSTEM
- 604 — SWITCHING SYSTEM RECEIVES DATA
- TO STEP 307 OF FIG. 3

FIG. 7

- TO STEP 308 OF FIG. 3
- 701 — READ LOCATION DATA FROM THE A NODE IN THE LIST
- 702 — PERFORM A LOOK-UP FOR LOCATION DATA
- 703 — RECORD FOUND ?
  - YES → 704 — READ TELEPHONE NUMBER FROM DATA RECORD → 705 — RETURN TELEPHONE NUMBER
  - NO → 706 — LAST ITEM ?
    - NO → (back to 701)
    - YES → 707 — RETURN ERROR SIGNAL
- FROM STEP 308 OF FIG. 3

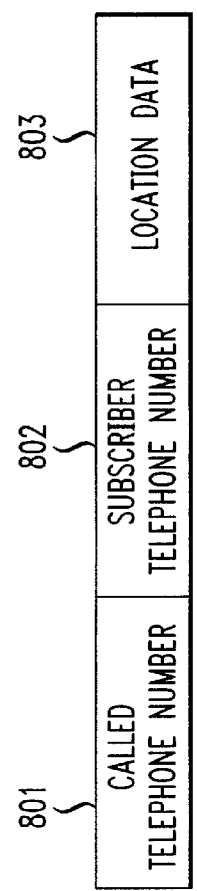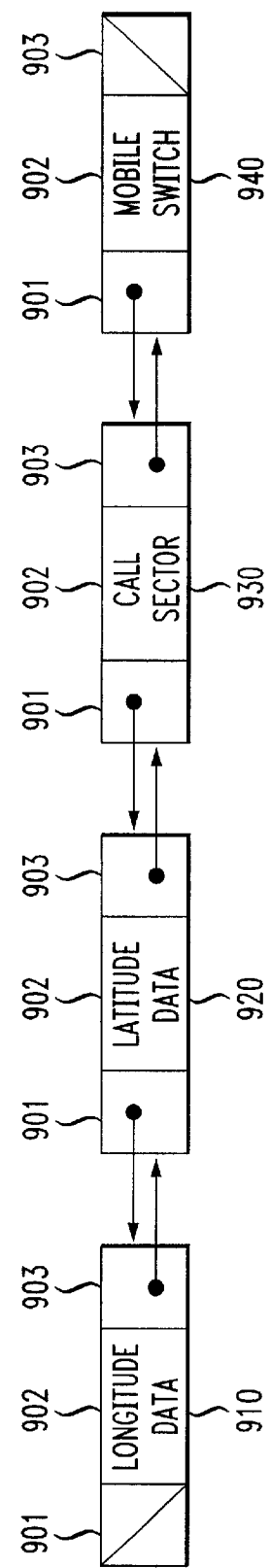

EXTENDING A LOCATION BASED TELEPHONE CALL FROM A WIRELESS TELEPHONE SET USING A GENERIC ROUTING LIST

FIELD OF THE INVENTION

This invention relates to the provision of a list of call routing parameter to use to determine which location based service provider should receive a location based telephone call from a wireless telephone set. More particularly, this invention relates to providing a plurality of call routing parameters that can be used in a predetermined order to determine the service provider that should receive the telephone call.

PROBLEM

It is a problem to provide location based telephone service to a wireless telephone set. Location based telephone service is the extending of a telephone call from the caller to a service provider serving the area from which the telephone call is being placed. Some examples of location based telephone services are a 911 emergency telephone service and a toll-free telephone number for a franchise that connects a caller to the nearest outlet of the franchise serving the caller. The determination of the nearest location based service provider is typically not a problem for a telephone call placed from a non-wireless telephone line. One common method for determining the location based service provider that should receive a call from a non-wireless telephone line is to simply extend the call to the location based service provider that is connected to the same central office switching system as the calling party telephone line. Another common method is to connect the caller to a service provider based upon a prefix in the telephone numbers of the callers and the location based service provider. Finally, it is also possible to maintain a database which stores a street address associated with each telephone number and to use the database to determine the service provider servicing the caller's telephone number based upon location.

It is a problem to provide location based telephone service to a wireless telephone set. The solutions for extending location based service calls from a non-wireless telephone set are not feasible for a telephone call placed from a wireless telephone set. Wireless telephones are mobile and a wireless caller may place a telephone call from anywhere in the callers area of coverage. The above methods for extending non-wireless telephone calls rely upon the fact that non-wireless telephones are not mobile and can easily be associated with one location which is not true for a wireless telephone set.

A telephone call from a wireless telephone is connected to the called party in the following manner. The wireless caller dials a telephone number. The wireless telephone set transmits radio signals to a cellular antenna that serves the sector from which the caller is calling. A connection over an available radio frequency band is then established between the telephone set and the antenna. A mobile switching system that provides telephone service for the wireless telephone receives and transmits radio signals to the wireless telephone via the antenna. The mobile switching system connects the wireless telephone network to the public telephone switching network.

In order to establish a telephone connection, the mobile switching station generates a call set-up message, which includes the wireless telephone number of the caller and the telephone number of the called party. The call set-up message is then transmitted to a non-wireless public switching system which establishes a connection to the called party. The problem in providing location based services is that there is no way to determine the location of a wireless telephone set placing a location based telephone call from the call set-up message. There is a need for a system that can provide the location of a wireless telephone set placing a telephone call and extend the telephone call to the location based service provider that provides service to that location.

Even if the location of the wireless caller is known, it may still be a problem to determine the service provider that should receive the call. This is because there may not be a service provider that serves the location of the caller. However, it may be desirable to extend the call to the nearest service provider that can handle the call. For example, a wireless caller may be calling 911 to report an accident from a side of a highway in an area not specifically covered by a fire and rescue district. It is desirable to extend the call to the nearest fire district that could then contact the proper authorities to handle the situation. There is a need for a system to route wireless call that is not entirely location dependent.

SOLUTION

The above and other problems are solved and an advance in the art is made by the provision of a generic call routing parameter list. This invention provides a list of call routing parameters to be used to extend telephone call from wireless telephone set to a location based service provider. The present invention determines the location of the wireless telephone set. The location of the wireless telephone set is that used to generate call routing parameters which are then placed in a list and transmitted to a switching system. The call routing parameters are then read in a predetermined order by the switching system until one of the parameters can be used to determine the location service provider that services the location of the wireless telephone set. The location based telephone call is then extended to the selected location based service provider.

In a first preferred exemplary embodiment of this invention, a wireless location system is connected to the mobile switching system. A telephone call to a location based service from a wireless telephone set is completed in the following manner. A wireless telephone establishes a radio connection to an antenna and transmits a location based telephone number to the antenna. The antenna transmits the location based telephone number to the mobile switching system. Upon receiving the location based telephone number, the mobile switching system transmits a request for location data about the wireless telephone set to the connected location system. The location system determines the location of the caller wireless telephone, generates the location data, and transmits the location data to the mobile switching system.

The mobile switching system receives the location data and then generates a call set up message that includes the location data. The call set-up message is transmitted to a connected non-wireless public switching system. The public switching system then performs a look-up routine in a location based service provider database using the location data from the call set up message to determine the location based service provider that provides service to the location of the caller. The telephone call is then extended to the service provider.

In a second exemplary embodiment, the wireless location system is connected to a public switching system. Location based wireless telephone calls are completed in the following manner. An antenna receives a telephone call placed to a location based telephone number from a wireless telephone set. The antenna establishes a connection with a mobile switching system. The mobile switching system generates a call set up message for a connection to the location based service and transmits the message to a connected non-wireless public telephone switching system.

When the public switching system receives the message, the system recognizes the called telephone number as a location based telephone number. The switching system then requests location data from the wireless telephone location system. The wireless telephone location system uses radio signals transmitted between the wireless telephone and antenna to determine the location of the wireless telephone set and to generate location data which is transmitted to the switching system. The switching system uses the location data to perform a look-up routine in a service provider database to determine the service provider that service the location of the caller. The switching system then extends the telephone call to the determined service provider.

In accordance with this invention, the location data in the above two embodiments is a list of call routing parameters. A call routing parameter is an indicator of the location of the wireless. The call routing parameters may be very specific such as the longitudinal and latitudinal global positions of the caller, or may be very general such as the mobile switching system providing telephone service to the caller. The list of call routing parameters begins with the very specific location information and proceeds to very general location information at the end of the list. A switching system that receives the list determines which service provider is to receive by reading the call routing parameters in the list until a service provider is found using one of the read parameters. The call routing parameters may be read in a specified order determined by a call set up protocol. For example, the switching system may begin by reading the longitudinal and latitudinal call routing parameters from the list. If a location based service provider cannot be determined using the longitudinal and latitudinal position, the switching system reads the next call routing parameter in the list which may be the cellular calling sector of the caller. If the location based service provider cannot be determined from the cellular calling sector, a parameter identifying the mobile switching system of the caller is read. This process is repeated until a location based service provider is found and the call is extended. Furthermore, it is possible for a location system to only include some of the call parameter in the list in which case incomplete call parameters are ignored.

DESCRIPTION OF THE DRAWINGS

The present invention can be understood by reading the following detailed description in conjunction with the following drawings:

FIG. 5 illustrating a flow diagram of a process for retrieving location data in a first exemplary embodiment;

FIG. 6 illustrating a flow diagram of a process for retrieving location data in a second exemplary embodiment;

FIG. 7 illustrating a flow diagram of a process for using a priority list of location data to determine a location based provider nearest to a caller;

FIG. 8 illustrating a data packet of a call set-up message; and

FIG. 9 illustrating a data structure of a priority list of location identifications for the caller.

DETAILED DESCRIPTION

Figure 1:
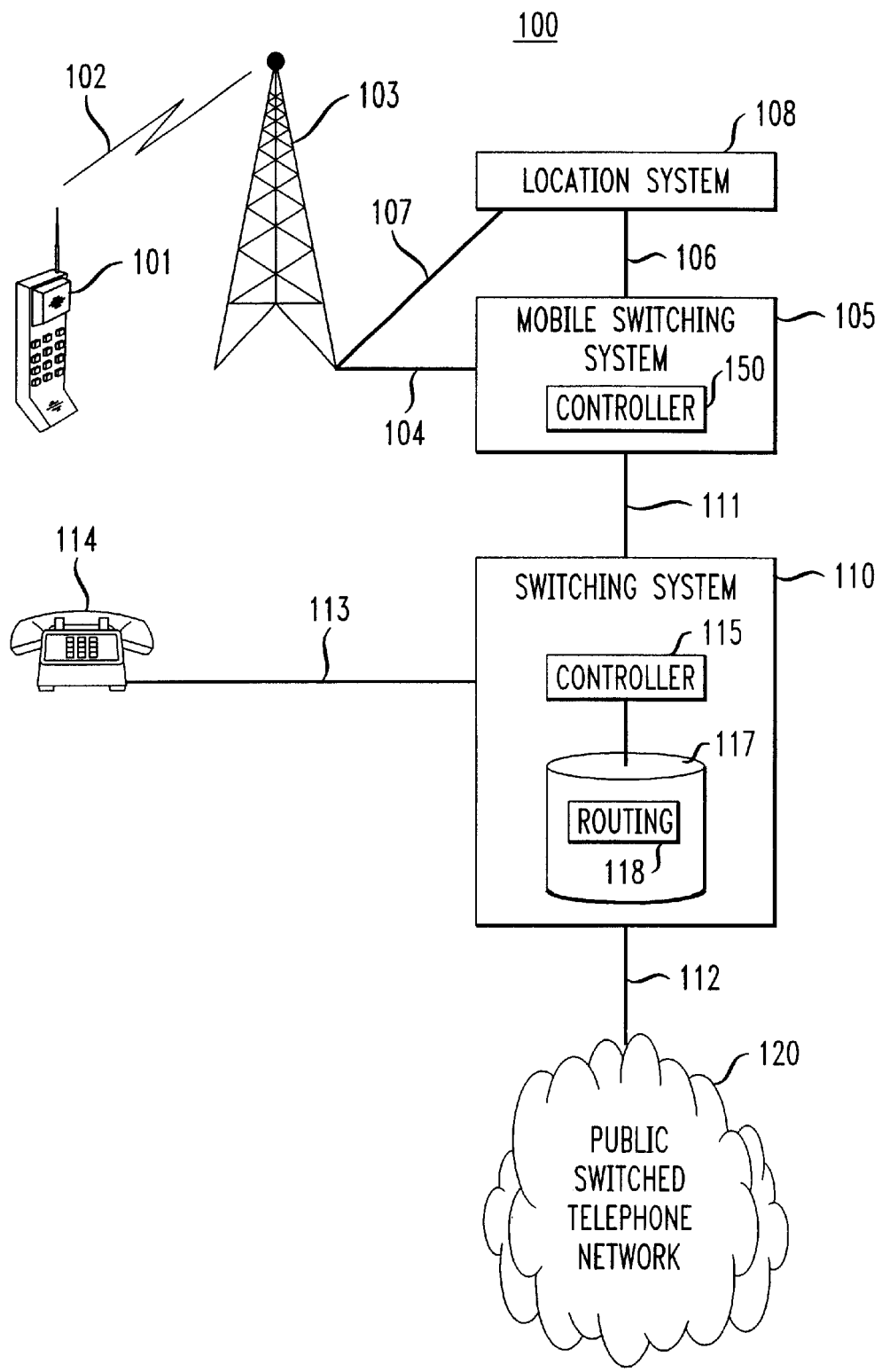
FIG. 1 illustrating a block diagram of one possible embodiment of components of a telephone system needed to provide wireless location based telephone service.

Components of a Telephone Network for Providing Location Based Wireless Service—FIG. 1.

FIG. 1 illustrates the components of telephone system 100 that provide location based services to a wireless caller telephone set 101. Radio Frequency (RF) signals 102 are transmitted between wireless caller telephone set 101 and antenna 103 to establish a connection between telephone set 101 and telephone network 100. Antenna 103 is connected to mobile switching system 105 via path 104. Mobile switching system 105 is a switching system that is connected to a plurality of antenna 103 to provide telephone service to a plurality of wireless caller telephone sets 101. Mobile switching system 105 has a controller 150 which comprises a processing unit for performing the functions of providing telephone service to wireless caller telephone sets 101. The provision of wireless telephone service by mobile switching system 105 is well known to those skilled in the art and is not discussed herein.

A location system 108 is connected to antenna 103 via path 107. Location system 108 is a system that can determine the location of wireless telephone set 101 by monitoring the RF signals 102 received by antenna 103 from wireless telephone set 101. Controller 180 is a processing unit that executes the processes for determining the location of wireless caller telephone set 101 in location system 108. The process for determining the location of telephone set is well known to those skilled in the art and is not discussed in detail.

Mobile switching system 105 provides a connection for wireless telephone set 101 to non-wireless public switched telephone network 120 via switching system 110. Switching system 110 and mobile switching system 105 are connected by trunk 111 to complete telephone calls between wireless callers and non-wireless callers. An example of a common switching system 110 is a 5 ESS central office switching system manufactured by Lucent Technologies. Controller 115 is a processing unit in switching system 110 which executes the required processes needed for switching system 110 to provide telephone service. Non-volatile memory 117 is a tape or disk drive capable of storing information on a storage media for a long period of time. Non-volatile memory 117 is used by controller 115 to store databases and other data needed to provide telephone service including the wireless location based services of the present invention. In order to provide location based services, memory 117 stores service provider database 118. Service provider database 118 is a database containing location data and area of coverage for the various service providers.

Switching system 110 is connected to public switched telephone network 120 via communication path 112. Communications paths 112 is representative of a plurality of trunks connecting switching system 110 to other switching systems in public switched network 120. Path 113 is representative a loop connecting a telephone station 114 to switching system 110. For purposes of the present discussion, telephone station 114 is associated with a telephone number that provides location based telephone services to callers. Location based telephone services are those services in which an incoming telephone call is extended to a service provider that provides service to the location of the caller placing the telephone call. It is also possible that a location based service provider may be connected to another switching system in network 120 in which case the call would be extended to the other switching system via a trunk in path 112.

Figure 2:
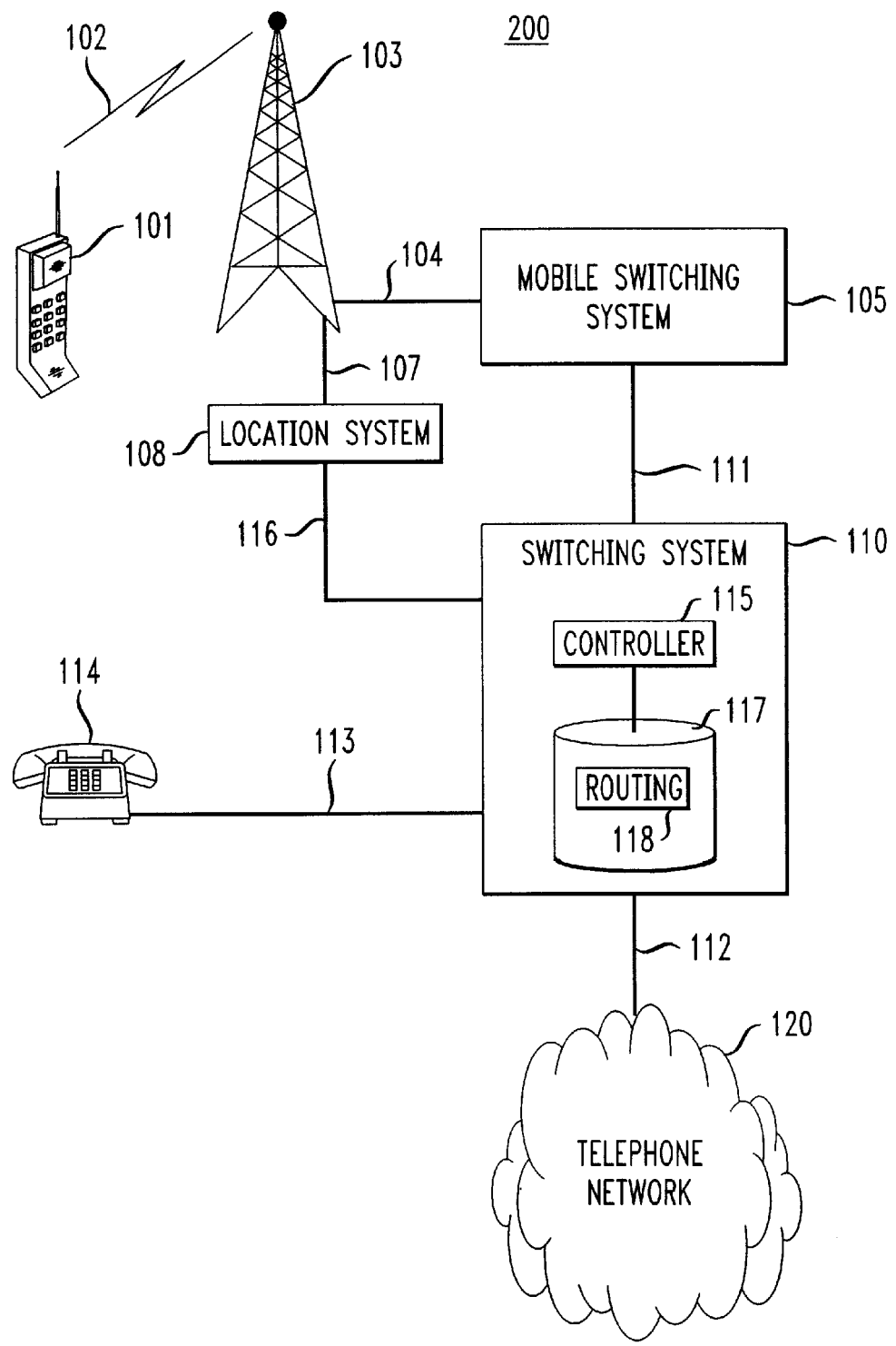
FIG. 2 illustrating a block diagram of a second possible exemplary embodiment of components needed to provide wireless location based telephone service.

Alternative Configuration of Components for Providing Wireless Location Based Services—FIG. 2.

Telephone system 200, illustrated in FIG. 2, is alternative second alternative exemplary embodiment in which location system 108 is connected to switching system 110 via communications path 116. This allows data to be transferred between location system 108 and switching system 110. The configuration of telephone system 200 allows location system 108 to calculate the location of wireless telephone set 101 while a call set-up message is being generated and transmitted from mobile switching system 105 to switching system 110. The switching system 110 requests the location information when needed. This avoids a delay in generating the call set-up message to wait for the location information to be received and avoids undue delays in routing the telephone call.

Figure 3:
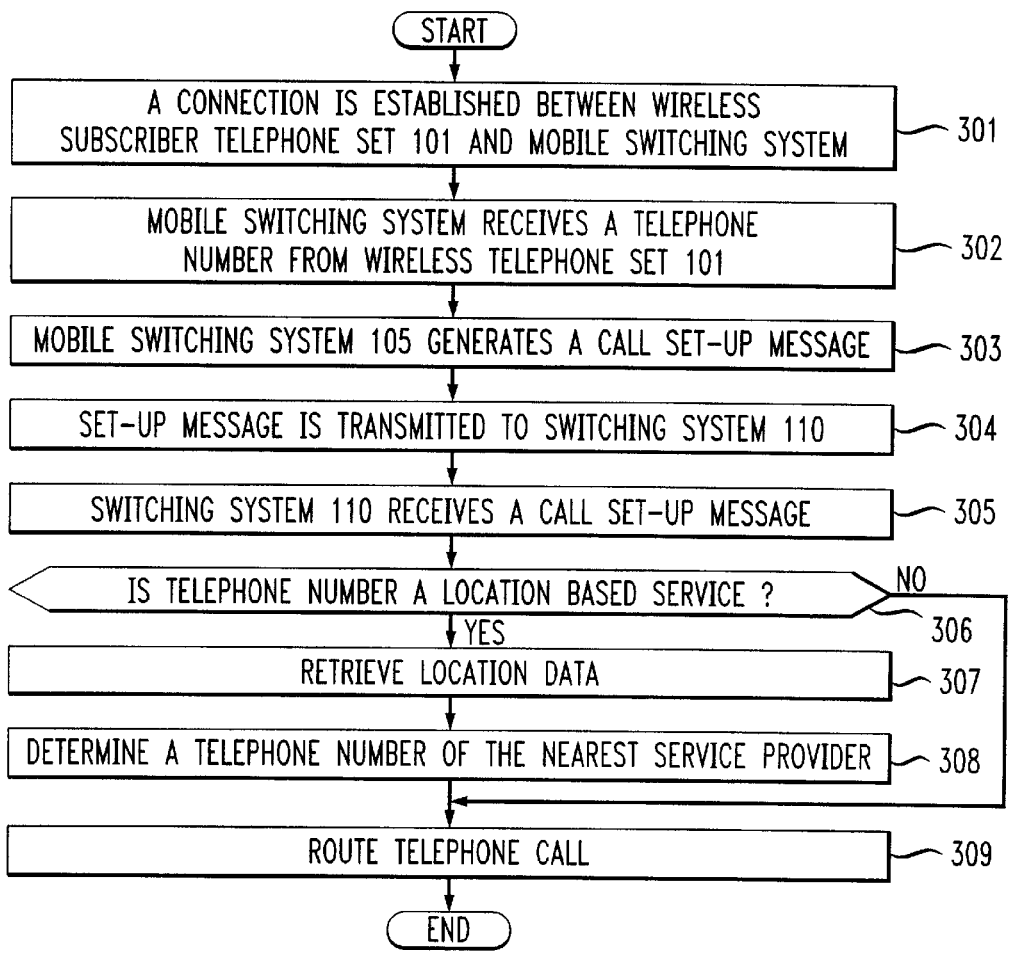
FIG. 3 illustrating a flow diagram of a process for providing wireless location based services.

An Operational Overview of a Process for Providing Location Based Services to a Wireless Caller—FIG. 3

FIG. 3 illustrates an operational overview of a process for providing location based services to a wireless caller. Depending upon which of the two above described configurations are used to provide location based service, the manner in which these steps are performed varies. For either configuration, the location data is a priority list (shown in FIG. 9) containing a plurality of different location identifiers or call routing parameters that can be used to determine the service provider that should receive the telephone call.

Process 300 begins in step 301 with a connection being established between wireless caller telephone set 101 and mobile switching system 105 via RF signals 102 and antenna 103. In response to a connection being established, a dial tone is transmitted to wireless caller telephone set 101. The caller is then able to dial a number. In step 302, mobile switching system 105 receives the dialed number from wireless telephone set 101.

Mobile switching system 105 generates a call set up message in step 303. A call set-up message is a request by mobile switching system 105 to establish a connection with a telephone line of the called telephone number. If location system 108 is connected to mobile switching system 105, process 400 illustrated in FIG. 4 can be used to generate the call set-up message. Otherwise, the call set-up message is generated in a standard manner and in a standard protocol such as SS7, that is well understood by those skilled in the art. Mobile switching station 105 transmits the generated call set-up message to switching system 110 in step 304 and in step 305, switching system 110 receives the call set-up message.

After receiving the call set-up message, switching system 110 determines if the telephone number is for a location based service in step 306. If the telephone number is not for a location based service, process 300 proceeds directly to step 309 and the telephone call is extended to the telephone number in the call set-up message. If the telephone number is for a location based service, the location data for wireless telephone set 101 is retrieved in step 307. The retrieval process is dependent upon the embodiment of the invention in used to provide location based services. If the first exemplary embodiment is used, process 500, illustrated in FIG. 5, retrieves the location information. If the second preferred exemplary embodiment is used, process 600, illustrated in FIG. 6, retrieves the information. In step 308, the location information retrieved is used to determine the telephone number of the location based service provider that provides service to the location is determined. The telephone call is then routed to the location based service provider that provides service to the location of the caller in step 309.

Figure 4:
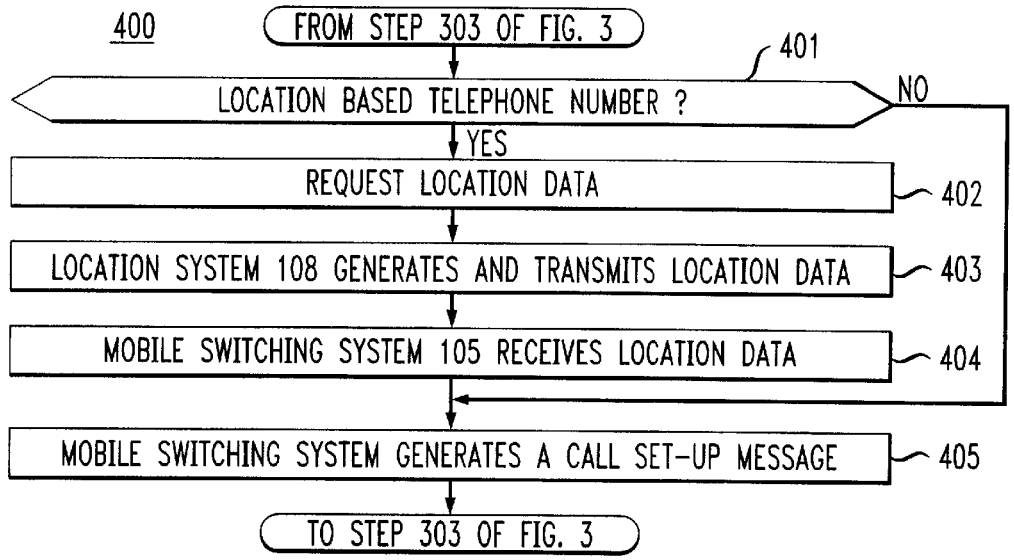
FIG. 4 illustrating a flow diagram of a process for generating a call set-up message in a first exemplary embodiment.

A Process for Generating a Call Set-up Message in a First Preferred Embodiment FIG. 4.

In a first embodiment of the present invention (shown in FIG. 1), telephone network 100 has location system 108 connected to mobile switching system 105. In order to provide location based services, mobile switching system 105 must transmit location data received from location system 108 to switching system 110. Process 400, illustrated in FIG. 4, generates a call set-up message which contains the location information for wireless telephone set 101.

Process 400 begins in step 401 with mobile switching system 105 determining if the received called telephone number is a location based service telephone number. If the telephone number is not a location based service telephone number, process 400 proceeds directly to step 405 and generates a standard call-step message. If the number is a location based telephone number, mobile switching system 105 transmits a request to location system 108 for location data of wireless caller telephone set 101.

Location system 108 receives the request and compiles the location data for wireless telephone set 101 in step 402. The location data may include the following different types of location identifiers or call routing parameters for a wireless telephone set 101: a longitudinal and latitudinal location of telephone set 101, the cellular sector from which wireless telephone set 101 is transmitting, and the mobile switching system 105 that is providing telephone service to wireless telephone set 101. Location system 108 then transmits this location data to mobile switching system 105 in step 403.

In step 404, mobile switching system 105 receives the location data from location system 108. The location data is then used to generate a call set-up message for a location based call in step 405. The call set-up message can be a packet of digital data representing a plurality of bit fields as illustrated in FIG. 8. Packet 800 has a message type identification field 801, a calling party identification field 802, a called party field 803, a command parameter field 804 storing a command indicating the call is to a location based service, and a data field 803 for the location data. After the call set-up message is generated, process 400 then ends by returning to step 302 of FIG. 3.

Processes for Retrieving Location Data—FIGS. 5 and 6.

The processes for retrieving location data in step 307 of FIG. 3 is illustrated for the two different embodiments in FIGS. 5 and 6. In the first embodiment (shown in FIG. 1), the location data for wireless telephone set 101 is transmitted in a call set-up message to switching system 110 and process 500 must be used to retrieve the location data from the call set-up message. In the second embodiment (shown in FIG. 2), location system 108 is connected to switching system 110 and receives the location data from location system 108. Process 600 is illustrated in FIG. 6 and retrieves the location information from location system 108.

Process 500 is illustrated in FIG. 5 and retrieves location data transmitted from mobile switching station 105 to switching system 110 in a call set-up message. Process 500 begins in step 501 with switching system 110 reading the call set-up message 800. In step 502, switching system 110 stores the information in field 803 which is the location data. The location data may be comprised of data as simple as the identity of mobile switching system 105, or as complex as the a call routing list described below in FIG. 9. Process 500 then returns to step 307 of FIG. 3.

Process 600 is illustrated in FIG. 6 and is the process used in a second embodiment (shown in FIG. 2) to retrieve the location data. In the second embodiment, location system 108 is connected to switching system 110. This allows location system 108 to compile the location data for wireless telephone 101 at the same time that a call set-up message is being generated and transmitted to switching system 110. The only time the location system is accessed is when location data is needed. This prevents a delay in the call set-up while mobile switching system 105 must wait to generate the call set-up message until the location data is generated.

Process 600 begins in step 601 in which switching system 110 transmits a request to location system 108 for location data of wireless telephone set 101. In step 602, location system 108 retrieves the location information for the request wireless telephone set 101. The location data can include the priority list in FIG. 9 or can be any other type of identity for the position of wireless telephone set 101 with respect to the service providers. In step 603, the location data is transmitted to switching system 110. Switching system 110 receives the transmitted data in step 604 and process 600 is completed by returning to step 307 of FIG. 3.

Process for Determining the Telephone Number of the Nearest Service Provider Based Upon Location Data in a Priority List —FIG. 7.

Either embodiment of the present invention can provide location data in a priority list as illustrated in FIG. 9 that is used by process 700, illustrated in FIG. 7, to determine the telephone number of the nearest service provider. Priority list 900 illustrated in FIG. 9 is a list of location identifiers called call routing parameters. The call routing parameters in list are ordered in a manner that an application performing process 700 expects to receive the call routing parameters. Although priority list 900 is described as a list it be contained in a message packet as consecutive groups of data.

Priority list 900 is comprised of nodes 910, 920, 930, and 940. Each node also contains one type of location data. In the illustrated priority list 900, node 910 contains longitudinal position data for wireless telephone set 101, node 920 contains latitudinal position data for wireless telephone set 102, node 930 contains the calling cellular sector of wireless telephone set 101, and node 940 contains the identity of mobile switching system 105 that is providing telephone service to wireless telephone set 101.

FIG. 7 illustrates a process 700 that goes through the information in the nodes of list 900 and attempts to determine the telephone number of the service provider from the location data in each node. One possible use for this type of search is if different types location systems that generate different kinds of location data are connected to the mobile switching systems. The different kinds of data could be placed in different nodes. A switching system could then read the nodes until data is found. The parameter list may be used to widen the scope of a search when data about the specific location of a wireless telephone does not produce a service provider. In this case, another parameter containing more generalized information may be used.

Process 700 begins in step 701 with switching system 100 reading location data from a node. In step 702, switching system 110 attempts to find a data record in a routing database for the location data from a node. In step 703, it is determined whether the a data record for the location information was found. If a data record was found in step 703, the telephone number is read in step 704 and the telephone number is returned in step 705. If a data record was not found, it is determined if the current node is the last node in the list in step 706. If the node is the last node an error signal is return in step 707. Otherwise, process 700 is repeated starting from step 701.

The above is a description of two exemplary preferred embodiments of a system for providing location based service to a wireless caller. Those skilled in the art can and will design other embodiments of the wireless location based service system that infringe on the following claims either literally or through the Doctrine of Equivalents.

What is claimed is:

1. A system for extending a telephone call from a wireless telephone set that is served by a cellular communication system to an automatically selected one of a plurality of location based service providers comprising:

means for determining a present location of said wireless telephone set;

means responsive to determining said present location of said wireless telephone set for generating a list that contains a plurality of call routing parameters, each of which is determined from said present location of said wireless telephone set and wherein each of said plurality of call routing parameters is a location identifier for said wireless telephone set; and means for transmitting said list of said plurality of call routing parameters to a switching system.

2. The system of claim 1 wherein said means for determining comprises:

means for identifying a longitudinal position of said wireless telephone set.

3. The system of claim 1 wherein said means for determining comprises:

means for identifying a latitudinal position of said wireless telephone set.

4. The system of claim 1 wherein said means for determining comprises:

means for identifying a sector of said cellular communication system that serves said wireless telephone set.

5. The system of claim 1 wherein said means for determining comprises:

means for identifying a cell site of said cellular communication system that provides telephone service to said wireless telephone set.

6. The system of claim 1 further comprising:

means in said switching system for automatically determining which location based service provider is to receive said telephone call using said plurality of call routing parameters.

7. The system of claim 6 wherein said means for determining uses said plurality of call routing parameters in a specified order of priority to determine said location based service provider.

8. A system for extending a telephone call from a wireless telephone set that is served by a cellular communication system to an automatically selected one of a plurality of location based service providers comprising:

a location system for generating a list that contains a plurality of call routing parameters that identify a present location of said wireless telephone set; and a switching system for determining a location based service provider to receive said telephone call from said wireless telephone set using said list and for extending said call to said service provider.

9. The system of claim 7 wherein said location system comprises:
means for determining a longitudinal position of said wireless telephone set.

10. The system of claim 7 wherein said location system comprises:
means for determining a latitudinal position of said wireless telephone set.

11. The system of claim 7 wherein said location system comprises:
means for determining an identity of a sector of said cellular communication system that serves said wireless telephone set.

12. The system of claim 7 wherein said location system comprises:
means for determining an identity of a cell site of said cellular communication system that serves said wireless telephone set.

13. The system of claim 7 further comprising:
a routing system in said switching system for determining which of said plurality of location based service providers is to receive said telephone call.

14. The system of claim 12 further comprising:
a routing system for determining said location based service provider by reading each of said plurality of call routing parameters in a specified order of priority and comparing said read call routing parameters to a routing database to determine said location based service provider.

15. A method for extending a telephone call from a wireless telephone set that is served by a cellular communication system to an automatically selected one of a plurality of location based service providers comprising the steps of:
determining a present location of said wireless telephone set with a location system;
generating a list of a plurality of call routing parameters for said wireless telephone set in said location system responsive to determining said present location; and
transmitting said list of call routing parameters from said location system to a switching system.

16. The method of claim 14 further comprising the step of:
identifying a longitudinal position of said wireless telephone set in said list.

17. The method of claim 14 further comprising the step of:
identifying a latitudinal position of said wireless telephone set in said list.

18. The method of claim 14 further comprising the step of:
identifying a sector of said cellular communication system that serves said wireless telephone set in said list.

19. The method of claim 14 further comprising the step of:
identifying a cell site of said cellular communication system that serves said wireless telephone set in said list.

20. The method of claim 14 further comprising the step of:
determining which of said plurality of location based service providers is to receive said telephone call from call routing parameters in said list using a routing system.

21. The method of claim 20 wherein said step of determining said location based service provider in said routing system comprises the steps of:
1.) reading a call routing parameter from said list;
2.) reading a call routing database;
3.) comparing said read call routing parameter to said call routing database to determine said location based service provider;
4.) determining which of said plurality of location based service providers is to receive said telephone call responsive to said comparison; and
5.) repeating steps 1.)–4.) in response to no location based service provider being determined with said call routing parameter.

* * * * *